Patented Jan. 6, 1948

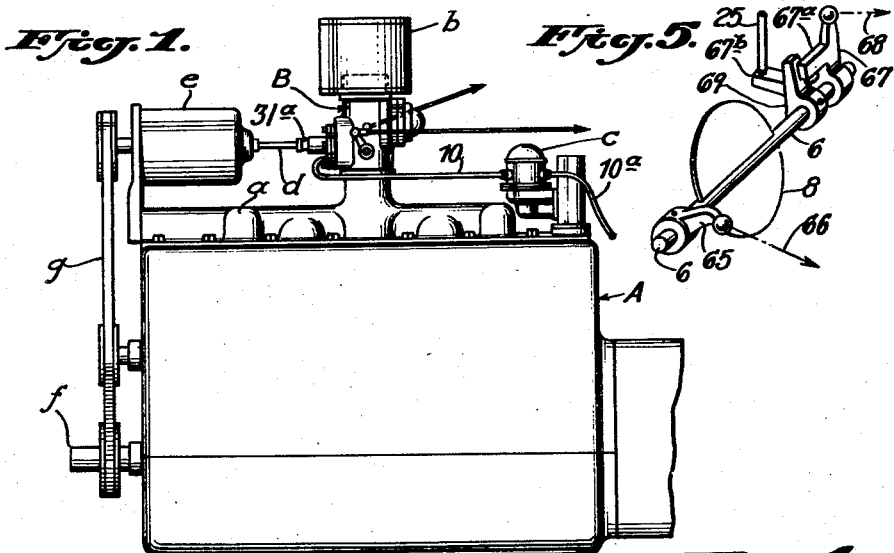
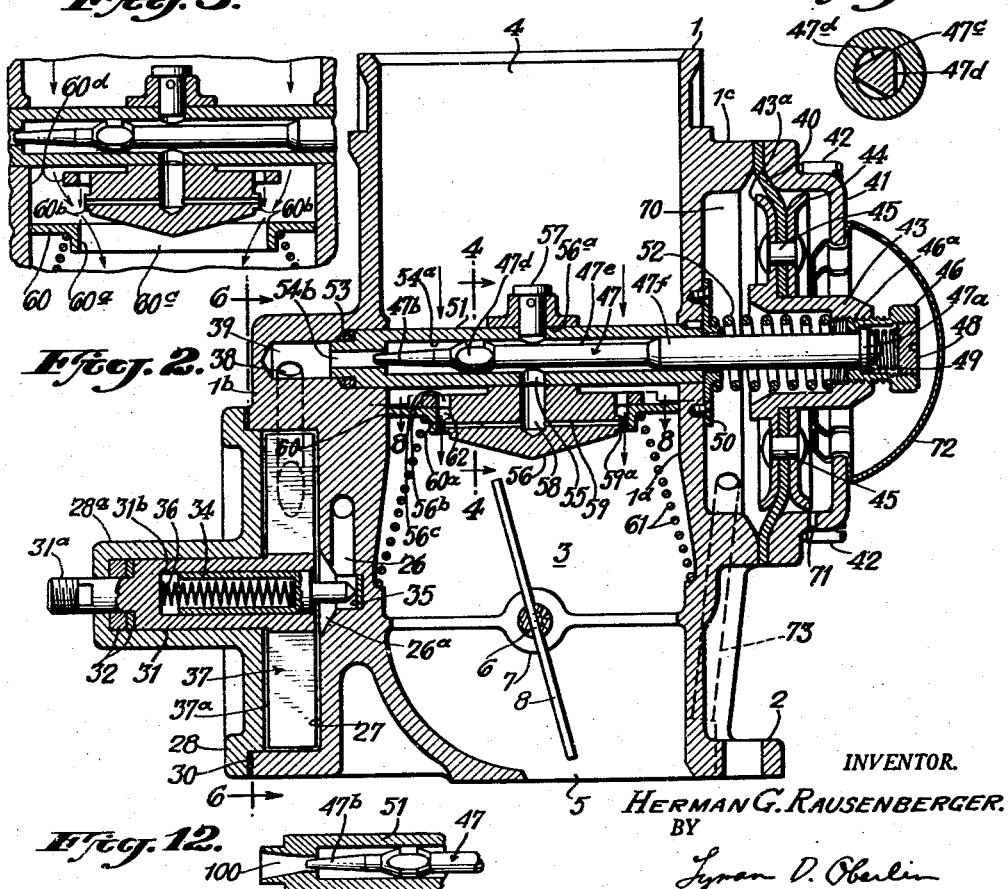

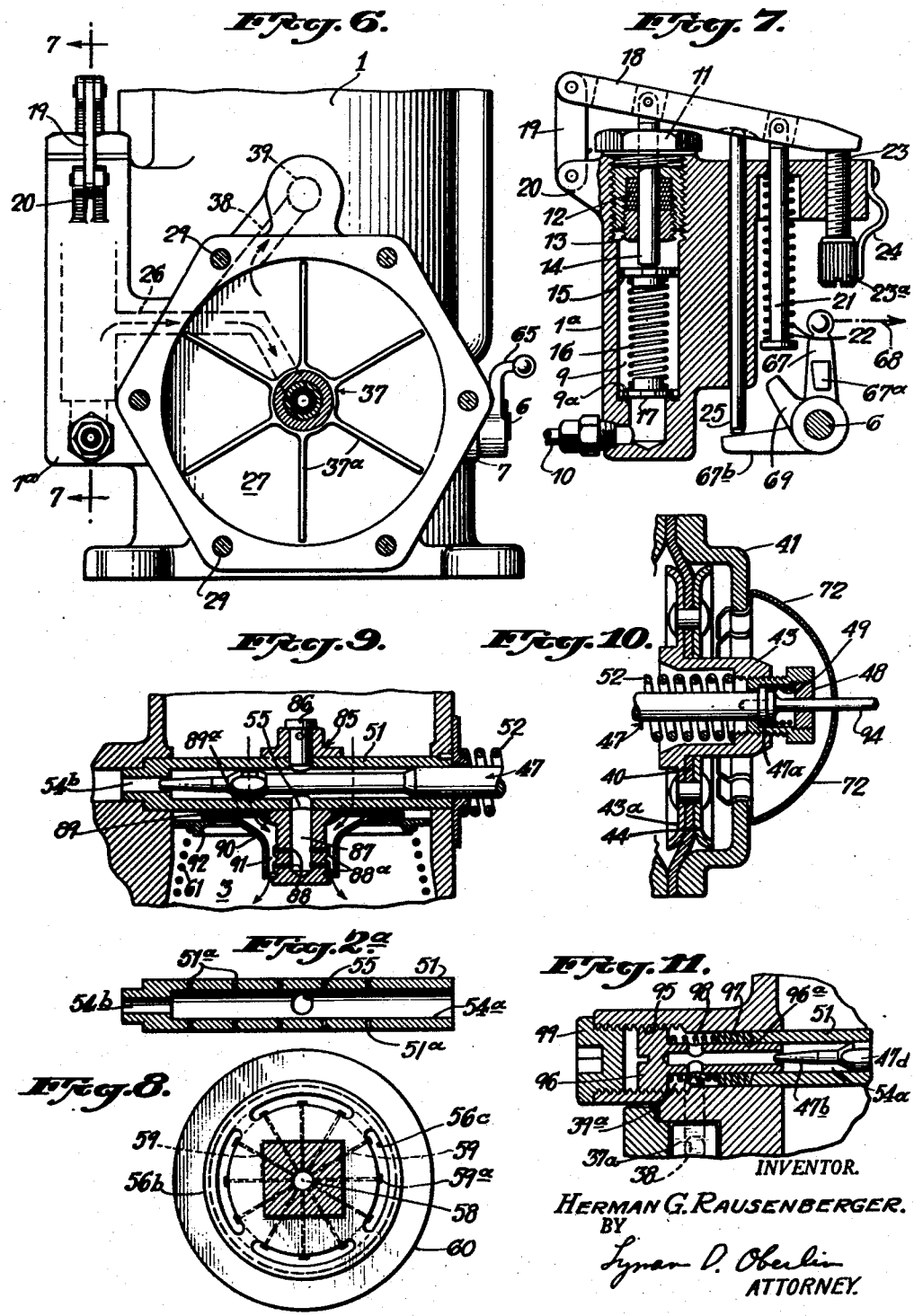

2,433,958

UNITED STATES PATENT OFFICE 2,433,958

APPARATUS FOR SUPPLYING LIQUID FUEL AND AIR TO VARIABLE-SPEED INTERNAL-COMBUSTION ENGINES

Herman G. Rausenberger, Yonkers, N. Y., assignor of one-half to Howard Murphy, Glen Ridge, N. J.

Application November 6, 1943, Serial No. 509,189

32 Claims. (Cl. 123—119)

This invention relates to improvements in apparatus and methods for supplying liquid fuel and air to internal combustion engines and particularly to variable speed engines of that type which receive their supply of fuel and air simultaneously.

Heretofore, two systems have been proposed and developed for the above specified purpose. In the more common of these two systems, liquid fuel is drawn by suction into the air stream entering the engine, and the device employed for effecting this operation and for mixing the fuel with the air is known as a carburetor. Consequently, for convenience of reference, this system will hereinafter be termed the carburetor system. In the other of the two systems above mentioned, liquid fuel is injected by a displacement pump or pumps into the main air stream drawn in by an engine or into each separate air stream drawn into the engine cylinders individually. This system is generally known as the injection system and it will be so referred to hereinafter.

The objective of all fuel and air supply systems is to furnish an engine with thoroughly mixed charges of fuel and air properly proportioned to produce complete combustion; that is, to furnish mixtures which will burn to carbon dioxide without any residue of carbon monoxide or free air, and thus secure the maximum degree of efficiency and economy of operation. This is a comparatively simple proposition in the case of engines that operate at constant speed under steady load, but if either the speed or load is varied, many complications are introduced, and when an engine is required to run under widely varying conditions of both speed and load, the problem becomes extremely difficult. In fact, the mixtures of fuel and air that are supplied to engines of the last-mentioned description are frequently so far from being properly proportioned that they would cease firing at times if it were not for the circumstance that, as shown by the Bureau of Mines, the ratio of fuel to air may be varied by as much as approximately 100% without destroying the explosive characteristics of such mixtures.

In the case of automotive engines, where both the speed and power demands commonly vary through a wide range, often as great as 25 to 1, tests in actual service have proven that such engines, when equipped with the fuel and air supply systems now in general use, consume from about 2% up to 60% more fuel per unit of power developed than is required with a system constructed in accordance with the present invention. In addition to this wasteful feature, both the carburetor system and the injection system include other inherent defects well known in the art.

Accordingly, it is one of the objects of the present invention to provide a fuel and air supply system for engines of the type specified, which does not include any of the faults or defects of the carburetor and injection systems.

A further object is to provide a fuel and air supply system which operates on fundamentally sound principles and which, therefore, does not require the inclusion of corrective or supplementary devices to compensate for deficiencies.

A further object is to provide a fuel and air supply system which does not operate on the principles of either the carburetor or injection systems, but on entirely novel principles proven by exhaustive tests to be sound and practical.

A further object is to provide a fuel and air supply system which is positively adapted to insure the formation of substantially uniformly proportioned mixtures of fuel and air, by weight, throughout the entire speed and load range of the engine which is supplied by said system.

A further object is to provide a fuel and air supply system which is positively adapted to insure substantially perfect combustion and the highest degree of fuel economy obtainable in practice throughout the entire speed and load range of the engine which is supplied by said system.

A further object is to provide a fuel and air supply system which insures the development of full engine power when desired, under all operating conditions, through the maintenance of a selectible uniformly proportioned mixture of fuel and air throughout the speed and load range of the engine which is supplied by said system.

A further object is to provide a fuel and air supply system which comprises means for normally producing substantially uniformly proportioned mixtures of fuel and air adapted for maximum economy under all operating conditions, and which also comprises auxiliary means for temporarily enriching said mixtures to any desired extent either manually or automatically, or both manually and automatically, so as to secure maximum power and maximum acceleration whenever required.

A further object is to provide a fuel and air supply system which includes means for regulating the action thereof in order to compensate for changes in temperature and in atmospheric pressure due to variations in altitude and other causes.

A further object is to provide means for thoroughly and uniformly atomizing liquid fuel supplied to internal combustion engines of the type specified under all operating conditions.

A further object is to provide a fuel and air supply system wherein the principal operating mechanism is adjustable, so as to permit of compensating for variations in manufacturing tolerances and thus eliminate the necessity for extreme accuracy of workmanship.

A further object is to provide a fuel and air supply system which is of extreme simplicity, dependable in operation, easy to adjust and exceptionally cheap to maintain.

A further object is to provide a fuel and air supply system which can be manufactured at low cost and which does not require any difficult or expensive machining or other operations.

A further object is to provide a fuel and air supply system which continually makes available maximum engine power and, therefore, eliminates the present necessity for employing overpowered engines, thus permitting the use of considerably smaller and lighter engines with consequent reductions in fuel consumption and manufacturing costs.

All of the foregoing and still further objects and advantages of the invention will become apparent from a study of the following specification, taken in connection with the accompanying drawings in which:

Figure 1 is an elevational view showing an internal combustion engine and an associated fuel and air supply system;

Fig. 2 is a vertical sectional view, partly in elevation, showing aparatus as constructed in accordance with my invention;

Fig. 2a is a horizontal sectional view showing the supporting tube for one of the valves of the invention;

Fig. 3 is a vertical sectional view, partly in elevation, showing a part of my novel apparatus with one of the valves of the invention occupying a position different than is shown in Fig. 2, Fig. 4 is an enlarged, transverse vertical sectional view taken on the line 4—4 of Fig. 2 looking in the direction of the arrows, Fig. 5 is a perspective view showing the throttle valve and supplementary control arrangement of my invention;

Fig. 6 is a transverse, vertical sectional view taken on the line 6—6 of Fig. 2 looking in the direction of the arrows;

Fig. 7 is a vertical sectional view, partly in elevation, taken on the line 7—7 of Fig. 6 showing a part of my novel apparatus;

Fig. 8 is a horizontal sectional view, partly in plan, taken on the line 8—8 of Fig. 2;

Figs. 9, 10 and 11 are vertical sectional views, partly in elevation, showing modified features of the invention; and Fig. 12 is a vertical sectional view, partly in elevation, showing a modified fuel-feeding duct and a control valve therefor.

Referring to Fig. 1, I have shown an internal combustion engine A which may be of any suitable character and utilizable for any desired purpose, such, for example, as a source of power for an automotive vehicle. The engine A comprises an intake manifold a to which atomized fuel is supplied by a novel device or apparatus B constructed, arranged and operable as hereinafter described.

For an illustration of the novel device B of my invention, reference is to be had particularly to Figs. 2 and 6 which show a chamber-forming housing 1 provided with a lower flange 2 utilizable for attaching the housing in its intended position in the manner hereinafter described. The housing 1 may be constructed in any suitable manner and of any suitable material although, as at present preferred, it is a die casting. As shown in Fig. 2, the housing 1 defines a space which serves as a fuel and air mixing chamber 3 having an inlet orifice 4 and an outlet orifice 5. Extending transversely through the mixing chamber 3 is a shaft 6 which may be supported by lugs 7 diametrically positioned at opposite sides of the housing 1. Each end of the shaft 6 extends to some extent beyond the lug 7 adjacent thereto and, in the mixing chamber 3, said shaft 6 has a throttle valve 8 suitably secured thereto for oscillatory movement therewith.

As shown in Figs. 6 and 7, the housing 1 comprises an offset section 1a having formed therein a vertical chamber 9 closed at its lower end and provided, adjacent said lower end, with a circular flange 9a which forms a valve seat. Communicating with the chamber 9, below the flange 9a, is a conduit or pipe 10 through which liquid fuel flows under pressure from any suitable source as hereinafter described.

The upper end of the chamber 9 is closed by a nut 11 provided with a central passage receiving packing material 12 held under compression by a nut 13 threaded into the lower end of said nut 11. The nut 11, packing material 12 and nut 13 are provided with a vertical passage in which a rod 14 is slidable. The rod 14 is engaged, at its lower end, by a disk 15 biased upwardly by a helical spring 16 confined between the lower surface of said disk 15 and the upper surface of a similar disk 17 which acts as a valve and which is disengageably seated upon the aforesaid flange 9a. As indicated in Fig. 7, the disks 15 and 17 are generally circular in conformation and fit slidably in the interior of the chamber 9. However, the outer periphery of each circular disk is flattened slightly at several points to permit the free passage of liquid fuel past said disks.

The upper end of the rod 14 is pivoted to a beam or lever 18, one end of which is pivoted to one end of a link 19 pivoted at its other end to a pair of lugs 20 projecting from the housing section 1a. The beam 18, adjacent its other end, has pivoted thereto a rod 21 which, in a free manner, extends downwardly through a passage provided therefor in the housing section 1a. A helical spring 22 is disposed around the rod 21, one end of the spring 22 being seated in a recess formed in said housing section 1a and the other end thereof engaging the lower headed end of the rod 21. As will be obvious, the spring 22 coacts with the rod 21 to bias the beam 18 in a clockwise direction, Fig. 7.

The beam 18, at the end thereof opposite the link 19, is engaged by the upper end of a screw 23 threaded through the housing section 1a. The head 23a of the screw 23 is vertically corrugated and is engaged under pressure by one end of a leaf spring 24 secured to said housing section 1a.

The beam 18, between the rods 14 and 21, is adapted to be engaged by the upper end of a rod 25 freely slidable in a vertical passage provided therefor in the housing section 1a. For a reason and in a manner hereinafter described, the rod 25 may be moved upwardly to thereby move the beam 18 in a counter-clockwise direction, Fig. 7.

Communicating with the aforesaid chamber 9, above the valve seat 9a, is one end of a passage 26 for liquid fuel, Fig. 6, this passage 26 preferably extending through the suitably proportioned wall structure of the housing 1, and terminating in a flared discharge port 26a, Fig. 2, which communicates with and constitutes the fuel inlet to a circular chamber 27 formed in a thickened wall 1b of the housing 1.

The chamber 27 is closed by a cover 28 suitably secured, as by screws 29, Fig. 6, to a flange on the exterior surface of said wall 1b, a gasket 30 being disposed between adjacent surfaces of the cover 28 and said flange.

The cover 28 comprises a central tubular section 28a extending perpendicularly therefrom, this tubular section 28a serving as a support for a shaft 31 having a reduced end section 31a extending freely through a passage provided therefor in the end wall of said tubular section 28a. As shown in Fig. 2, it is desirable that the shaft end section 31a carry a pair of sealing washers 32 which are seated between the shouldered end of the shaft 31 and said end wall of the tubular section 28a.

The shaft 31 comprises a central bore 31b which freely receives a sleeve 34 having a reduced end section in contact with a bearing member 35 seated against the adjacent housing surface. Although this end section of the sleeve 34 is positioned in the discharge end 26a of the passage 26, the size thereof is such that it has no undesirable effect on the flow of liquid fuel through said passage 26 and the discharge port 26a thereof. The sleeve 34 is formed with a central passage open at one end and closed at its other end. Disposed in this sleeve passage is a helical spring 36 serving to bias the shaft 31 and sleeve 34 in opposite respective directions whereby these parts are maintained in proper operative position as shown in Fig. 2.

The shaft 31, at the end thereof toward the right, Fig. 2, has secured thereto a plurality of angularly related impeller blades 37a thus forming an impeller or centrifugal pump rotor 37, Fig. 6, which is disposed and operable in the aforesaid chamber 27. As shown, the blade dimensions are such that the edges thereof are disposed closely adjacent the wall surfaces of said chamber 27.

Communicating with the aforesaid chamber 27 is one end of a passage 38 for liquid fuel, Figs. 2 and 6, this passage 38, preferably, extending through the wall structure of the housing 1 and terminating in a chamber 39 formed in the aforesaid housing section 1b.

Referring to Fig. 2, the housing 1, at the side thereof generally opposite the wall 1b thereof, is provided with an outwardly extending flange 1c. A circular flexible diaphragm or pneumatic device 40 formed preferably from pliant material, such as rubber or rubberized fabrics, is secured to the outer surface of the flange 1c by a cap member 41 attached to said flange 1c by a plurality of screws 42, or equivalent.

The diaphragm 40 is provided with a central passage through which extends a tubular member 43 comprising a flange 43a disposed at one side of said diaphragm 40 which, on its other side, is engaged by a member 44 having a central passage through which said tubular member 43 also extends. The flange 43a and member 44 are secured flushly to the diaphragm 40 by a plurality of rivets 45, or equivalent. With an arrangement of this character, it will be understood that the diaphragm 40 is adapted to act as a piston, and that it supports the tubular member 43 and readily permits movement thereof in a direction from right to left, Fig. 2, and vice versa.

The tubular member 43 comprises a central passage which is interiorly threaded for the reception of a nut 46 having a central passage defined, in part, by an inwardly extending circular flange 46a at the end of said nut 46 toward the left, Fig. 2. Extending loosely through the passage defined by the nut flange 46a is one end of a valve member or rod 47, which comprises a circular head 47a loosely disposed in the passage of said nut 46 and adapted to engage said flange 46a. This passage, at the end thereof toward the right, Fig. 2, is defined by an interiorly threaded surface into which a sealing disk 48 is threaded. Confined between the disk 48 and the head 47a of the valve member 47 is a helical spring 49 utilizable for biasing said head 47a into engagement with the nut flange 46a. The valve member 47, then, is constrained to move with the member 43 from left to right and vice versa, unless, when moving toward the left, the valve member should encounter sufficient resistance to overcome the tension of spring 49, when movement of the valve member would cease. This arrangement, therefore, constitutes a resiliently extended telescopic connection between the pneumatic device 40 and the valve member 47.

From the nut 46, the valve member 47 freely extends through the tubular member 43, through a disk 50 and terminates interiorly of a tube 51, which extends through the mixing chamber 3 and which is held in position by said disk 50, suitably secured to an exterior surface of the housing 1. Confined between this disk 50 and an interior flange of the tubular member 43 is a helical spring 52 which is disposed around the valve member 47.

The tube 51, referred to above, may be formed from metal, or a phenol condensation product or the like, and, along a portion of its length, it is provided with a series of preferably horizontal passages 51a, as shown in Fig. 2a, open to the upper portion of the chamber 3 which is at all times in full and free communication with the atmosphere by way of the orifice 4.

The end of the tube 51 toward the left, Fig. 2, is supported in an extension of the aforesaid chamber 39, suitable packing 53 being disposed between said end of the tube 51 and the adjacent housing surface to prevent passage of liquid fuel from the chamber 39 along the exterior tube surface. The end of the tube 51 toward the right, Fig. 2, is supported in a passage extending through the housing wall, this passage being longitudinally alined with the aforesaid chamber 39.

In accordance with the form of the invention herein shown, the tube 51 defines a passage through which liquid fuel passes from the chamber 39 to a discharge port 55 formed in said tube 51. The passage of the tube 51 consists of a main passage 54a relatively large in cross-sectional area and a passage or duct 54b relatively small in cross-sectional area. It follows, then, that the end portion of the passage or duct 54b toward the right, Fig. 2, is an orifice through which liquid fuel is discharged into the passage 54a. In accordance with the invention, the cross-sectional area of this duct discharge opening or orifice is controlled or varied in the manner hereinafter described.

The valve member 47 referred to above comprises an end section constituting a valve 47b having slightly conical or tapered conformation. This conical section or valve 47b, to more or less extent, preferably remains in the duct 54b at all times in order that the diameter of said duct may be held within practical limits as will be explained hereinafter.

At the right of its conical section 47b, the valve member 47, throughout a restricted part of the length thereof, comprises an enlarged section having spaced peripheral surfaces 47c, Fig. 4, which, respectively, engage the interior surface of the passage 54a, the surfaces 47c being separated by surfaces 47d, preferably flat, which are spaced from the surface of said passage 54a. The surfaces 47c guide and support the valve member 47 without transverse play when it moves in either direction in the passage 54a. It will be understood that, with this arrangement, liquid fuel is free to pass through the passage 54a by way of the channels formed in part by the aforesaid surfaces 47d.

The valve member 47 further comprises a section 47e of reduced diameter and of such length that the inner end of the central discharge port 55 through the wall of the tube 51 remains uncovered at all times. Still further, the valve member 47 comprises a section 47f maintaining a piston fit with the passage 54a at the end thereof toward the right, Fig. 2.

In accordance with the invention, liquid fuel, after it leaves the aforesaid discharge port 55, is subjected to an atomizing operation. For an illustration of one of the forms of apparatus which is thus utilizable, reference is to be had to Figs. 2, 3 and 8, wherein an atomizing device comprising a structure 56, which preferably but not necessarily is a die casting, is shown as provided with a horizontal passage 56a through which the tube 51 extends, said structure 56 being suitably secured to the tube 51, as by a pin 57.

The structure 56, below the tube 51, is circular in horizontal section as shown in Fig. 8 and comprises a passage or fuel well 58 which communicates with the aforesaid discharge port 55 of the tube 51. In turn, the passage 58 communicates with a plurality of radially extending conduits or passages 59, each terminating just beyond the exterior surface of the structure 56 in a boss 59a.

The structure 56 comprises an upper circular flange 56b slotted to provide passages 56c, said flange 56b having greater diameter than the lower circular part of said structure 56. The lower surface of said circular flange 56b serves as a seat which is engaged by a ring valve 60 biased in an upward direction by a helical spring 61 seated on an inwardly extending housing surface in the mixing chamber 3, said valve 60, in freely movable relation, snugly engaging the interior circular surface 1d of the housing 1. The valve 60 comprises an inner cylindrical surface 60a which, with the adjacent circular surface of the structure 56, forms a narrow annular channel 62 into which fuel is discharged from the aforesaid passages 59, this channel 62 communicating with said passages 56c through the flange 56b.

Referring to Fig. 1, the device B of my invention is shown as attached directly to the intake manifold a of the engine A to which it may be secured by the flange 2 and associated screws. The mixing chamber 3, through its outlet orifice 5, is in direct communication with said intake manifold a and, preferably, an air cleaner b, as known in the art, is associated with the housing 1 in such manner that air from the atmosphere necessarily passes through said air cleaner b before entering the inlet orifice 4 of the mixing chamber 3. Carried by the engine A, or otherwise as may be desirable, is a liquid fuel pump c of a type well known in the art, as for example, one wherein the pumping element is a diaphragm impelled by a spring on its discharge stroke and by the engine or other source of power on its suction stroke. The pump c, through a pipe or conduit 10a, receives liquid fuel from any suitable tank, not shown, the liquid fuel being urged from said pump c, under the pressure exerted by said spring-actuated diaphragm, by way of the conduit 10 hereinbefore described which communicates with the chamber 9.

The end section 31a of the impeller shaft 31 has connected thereto a shaft d, preferably of the flexible type, which is connected to the driven shaft of a generator e, or other engine driven member; said generator shaft being suitably driven by the engine, as by the crank shaft f thereof with which it is connected by a belt g.

The foregoing detailed description of Fig. 1 is given solely for purposes of explanation of the invention. It will be understood that the device B may be mounted otherwise than as shown in suitable manner and the connection thereof to the intake manifold may be direct or indirect by way of a pipe, not shown. It will also be understood that, in any other suitable manner, the impeller shaft 31 may be rotated at engine speed or at a rate proportional to engine speed.

As previously explained, the diaphragm 40, the tubular member 43, the nut 46, the valve member 47 and the spring 52 form a movable mechanical system which, in accordance with the invention, is movable in opposite directions as hereinafter described. In this system, the loose radial connection between the nut flange 46a and the valve member 47 is advantageous because permitting said valve member 47 to assume the position imposed thereon by the tube 51 free from lateral strain.

The diaphragm 40 is sealed to the flange 1c by the cap member 41. Hence, the diaphragm 40, the flange 1c and the housing surface bordered thereby form a chamber 70 which is substantially sealed, except from the manifold passages as hereinafter described. The outer or right-hand side of the diaphragm 40, Fig. 2, should be freely exposed to atmospheric pressure and to this end, if required, a passage 71 may be provided in the cap member 41. The cap member 41 is shown as carrying a detachable flexible cover member 72. This cover member 72 may be readily removed and replaced whenever it becomes necessary to adjust the nut 46, which may obviously be done at any time whether the engine is running and the device B is functioning or not.

As shown in Fig. 2, the aforesaid chamber 70 is connected by a passage 73 with the intake passages of the engine on the low pressure side of the throttle valve. This passage 73, instead of opening into said intake passages as indicated in Fig. 2, may be closed at or adjacent its lower end and connected by a pipe with some other portion of said intake passages.

Referring to Fig. 5, the throttle valve shaft 6 referred to above is shown as having secured to one end thereof a lever 65 which, by a mechanical connection 66, such as a rod, may be connected to the accelerator pedal of an automotive vehicle or to any suitable control member. Loosely mounted on the other end of the shaft 6 is a lever 67 having angularly related arms or extension 67a and 67b, said lever 67, by a mechanical connection 68, such as a rod, being adapted to be operated manually or automatically, or both manually and automatically, as desired. The lever arm 67b is engaged by the lower end of the rod 25 hereinbefore described. The lever arm 67a is adapted to be engaged by a lever 63 secured to the shaft 6 for oscillatory movement therewith.

The operation of the system of the invention in producing uniformly proportioned mixtures of fuel and air by weight, which is only one of its several functions, is, of course, dependent upon the methods by which both of these elements are supplied. The method by which air is supplied will first be described, and subsequently the method of supplying fuel will be explained.

Referring to Fig. 2, it is evident, from what has preceded, that when the orifice 5 of the housing 1 is suitably connected with the intake manifold of an operating engine, air will be drawn into the cylinders of said engine from the atmosphere by way of the inlet orifice 4 and the central passage or chamber 3. It is obvious from an examination of Figure 2, that the flow of air thus drawn through chamber 3 is restricted by the relatively small passages 56c through the member 56 and the narrow channel 62 around the lower portion thereof. This restriction is, however, intended to cause only very slight resistance to the air flow, the purpose of which will subsequently be explained. The design is such that when the engine is running at slow speed under light load, the areas of the passages 56c and the channel 62 are sufficiently large to permit the small volume of air then required by the engine to flow through said passages under the action of a slight pressure differential. If a greater amount of air is drawn into the engine, because of an increase in load or speed, or both, the tension of the spring 61, which is of light proportions and extremely flexible, is so determined that valve 60 will be moved downwardly by the resulting increase in said pressure differential to sufficient extent to provide an annular passage 60b, Fig. 3, between the valve 60 and the structure 56. As downward movement of the valve 60 continues, the cross-sectional area of the passage 60b increases until, eventually, it is defined by the cross-sectional area of the valve opening 60c.

It will be understood from what has preceded that the purpose of the valve 60 and the members associated therewith is not to obstruct or retard the flow of air through chamber 3, but simply to create a relatively slight, substantially constant air pressure differential between the upper and lower portions of that chamber for atomizing purposes. Thus, when the valve 60 is closed, as shown in Fig. 2, a stream of air flows through the passages 56c and the annular channel 62 to atomize fuel passing into said channel 62 from the passages or conduits 59. With the valve 60 open, as shown in Fig. 3, a stream of atomizing air continues to flow through the passages 56c and, in addition, another stream of atomizing air flows through the passage 60b. It is, therefore, obvious that the valve 60, whether open or closed, thus serves to direct the air flow across the outlets or nozzles of the fuel conduits 59. Actually, the area of the annular passage 60d between the outer surface of the flange 56b and the adjacent inner surface 1d of the housing 1 is equal, approximately, to the area of the valve passage 60c and either of these areas is equal, approximately, to the area of the outlet orifice 5 from the chamber 3, so that when the valve 60 is wide open it does not impede the flow of air through the chamber 3 to any appreciable extent; this effect being contributed to by the extreme flexibility of the spring 61 and the fact that the kinetic action of the air stream impinging upon the flat horizontal surface of the valve 60 more than offsets the increased tension of said spring due to its increased compression when the valve 60 is in a more or less wide open position, particularly when the engine speed is relatively high.

It is now evident that in so far as the valve 60 and the cooperating members above specified are concerned, the flow of air through chamber 3 is so slightly obstructed that no drop in pressure of any practical importance in the operation of the engine will be occasioned thereby at any time, which is in accordance with the purpose and design of the present invention.

As shown in Fig. 2, a conventional type of throttle valve 8 is located, as previously described, in the lower portion of the mixing chamber 3. The purpose of this valve and the functions performed by it are precisely the same as those of similar valves in ordinary injection and carburetor systems, namely to control the flow of fuel and air mixtures to the engine to thereby regulate its speed and power output. Furthermore, the valve 8 is adapted for manual actuation in the usual way through the medium of the shaft 6 and lever 65, Fig. 5. Consequently, no special attachments nor instructions are required for the operation and control of the system of the invention, because, as will later be explained, the only additional control which is provided is operated in the same general manner as a "choke," though certain advantages are possessed thereby that are not includued in any other system.

Hence, it is apparent that in the case of the present invention, as in ordinary systems, the flow of air to the engine and the pressure thereof in its intake manifold follow no law but are, on the contrary, subject to frequent and more or less sudden and wide fluctuations, occasioned in part by changes in engine speed due to variations in load, and in part by the opening and closing of the throttle valve 8 at the option of the operator. It is, therefore, obvious that the production of fuel and air mixtures of uniform consistency can best be secured through control of the fuel supply alone, so that the weight of fuel delivered to the engine during each infinitesimal unit of time shall bear an unchanging ratio to the weight (not volume) of air drawn into the engine during each corresponding unit of time. This is accomplished by the system of the present invention in the following novel manner.

Referring to Figures 1, 2 and 7, liquid fuel is supplied by the pump c through the pipe 10 to the lower part of the chamber 9. As previously explained, the pump c is of the conventional type wherein a reciprocating diaphragm is employed, the diaphragm being impelled on its discharge stroke by a spring. Consequently, such a pump maintains a substantially constant delivery pressure, usually about three pounds per square inch above atmospheric pressure, when means are provided for compensating for the pulsating action thereof.

By adjusting the screw 23, Fig. 7, the tension of the spring 16, which presses the valve 17 toward its seat 9a, is preferably regulated so that the pressure of the liquid fuel in the upper portion of chamber 9 is reduced by valve 17 to such a degree that fuel will flow under the power of the pump c from the chamber 9 through the duct 26 and inlet port 26a into the chamber 27 and thence through the duct 38 into chamber 39 with just sufficient force to elevate it thereto and to overcome friction. Consequently, the pressure of the fuel thus entering the chamber 39 is substantially equal to atmospheric pressure. In this manner, it is apparent that the supply of fuel to the rotary impeller or centrifugal pump 37 may be sustained at a constant pressure, which in this embodiment of the invention differs very slightly from atmospheric pressure, unless the adjustment of the spring 16 is altered from its above described setting.

In order to compensate for the pulsating action of the pump c, an air chamber may be provided and connected with the pump discharge line at any convenient point, as it common practice. In the embodiment illustrated, a portion of the chamber 9 above the outlet passage 26 constitutes such a chamber, air being trapped in said chamber above said passage by the inflowing fuel delivered thereto by the pump c.

The impeller 37 driven by the engine, as hereinbefore described, rotates the liquid fuel in the chamber 27, and, according to a well-known law, the pressure of the fuel thus rotated at any point between the center of rotation and the outer periphery of the chamber varies directly as the square of the speed of rotation and, therefore, as the square of the engine speed which causes said rotation. In this connection, it is important to note that in accordance with the present invention, it is essential to maintain the pressure relationship just specified, which is accomplished by constructing the fuel impeller 37, the chamber 27 and the passages 26 and 38 connecting therewith so that the capacities thereof are considerably oversize in comparison with the maximum quantity of fuel flow therethrough per unit of time. In this way, no appreciable drop in pressure will be occasioned by frictional losses during operation of the device.

From what has preceded, it is apparent that means are provided for creating and maintaining a fuel pressure at the outer periphery of chamber 27 and, therefore, in the discharge passage 38 and chamber 39, which is equal to a constant multiplied by the square of the engine speed at any particular instant, the value of the constant depending upon the weight of the fuel per cubic unit and other fixed factors. This same pressure is obviously maintained in the duct 54b which is in free communication with the chamber 39. Furthermore, around the outlet of duct 54b, which constitutes the discharge of the pump 37 and which terminates in the passage 54a, substantially constant pressure is maintained, because of the free communication of said passage 54a with the upper portion of the mixing chamber 3 by means of the passages 51a, Fig. 2a. In this connection, it will be understood that the cross-sectional area of the upper portion of chamber 3 is constructed in such ample size that the pressure therein remains substantially constant and does not decrease at any time sufficiently below atmospheric pressure to have any practical effect on the operation of the system. However, in certain cases it may be desirable to connect the passages 51a directly with the outside atmosphere, which may be readily accomplished by means of suitable tubes or equivalent.

Now according to another well-known law, the velocity with which a liquid flows through an orifice is independent of the area thereof and is equal to a constant multiplied by the square root of the net pressure causing the flow, the value of the constant depending upon the specific gravity of the liquid and other fixed factors. As the net pressure in this case is equal, as shown, to a constant multiplied by the square of the engine speed, the velocity, with which fuel flows through the outlet of the duct 54b, as controlled by the valve 47b, is equal to the square root of the square of the engine speed multiplied by a constant and, therefore, said velocity of flow is directly proportional to the first power of the engine speed, or in other words, the velocity of fuel flow varies in straight-line relationship with the engine speed.

For a clear comprehension of what follows, the terms "effective area" and "net displacement" should now be defined. Hereinafter, it shall be understood that when the term "effective area" is used in connection with the fuel delivery duct or passage 54b, it will mean the orifice or the most restricted area of said passage or duct 54b, as varied by the valve 47b, through which fuel may flow, which, in the illustrated embodiment of the invention, is the area of the end portion thereof controlled by the valve 47b, where said area is of annular configuration. Obviously, because of the tapered form of the valve 47b, the effective area of said duct is varied when the valve is moved longitudinally, being increased when the motion is to the right, Fig. 2, and decreased when the motion is to the left. Also, hereinafter, the term "net displacement", when used in connection with an engine, shall mean the total volume displaced by the pistons thereof during their intake strokes only, while the crankshaft makes one complete revolution. In other words, the term "net displacement" shall mean the total net volume of non-compressible fluid which would be drawn into an engine per one revolution of its crankshaft, if the engine were being supplied with such a fluid instead of a mixture of fuel and air.

As fully set forth in the preceding paragraphs, the system of the invention provides positive means for causing fuel to flow from the valve-controlled outlet of the duct 54b with a velocity which is always directly proportional to the speed of the engine with which said system is associated, regardless of variations in the effective area of said outlet. As will later become apparent, this is one of the vital features of the invention and is accomplished by reason of the fact that the flow of fuel through the duct 54b is effected by three pressures namely, (1) the pressure developed in the chamber 27 by the engine-driven impeller 37, this pressure varying directly as the square of the engine speed, (2) the pressure of the fuel supplied to the chamber 27 through the pressure reducing valve 17 by the fuel pump c, or equivalent, and (3) the pressure in the passage 54a of the tube 51. In accordance with the invention, the second and third pressures noted above are normally maintained constant and substantially equal to atmospheric pressure or supercharger pressure. Therefore, the second and third pressures neutralize each other and, as stated, the fuel is caused to flow through the valve-controlled outlet or orifice of the duct 54b by the engine-driven impeller or centrifugal pump 37 with a velocity which is always directly proportional to the speed of the engine. It is further apparent that the velocity of the fuel is substantially dissipated as soon as it enters the relatively large passage 54a. If this does not happen entirely, the velocity-dissipating action is completed when the fuel engages the enlarged section of the valve 47 in part defined by the surfaces 47c, 47d.

Accordingly, it will be understood, by reason of the fact that the tube 51 is on the high pressure side of the throttle valve and, further, by reason of the fact that the interior of this tube is maintained substantially at constant atmospheric pressure in the example shown, that the suction effect of the engine is without effect on the passage of the liquid fuel through the valve-controlled outlet or orifice of the duct 54b.

It should also be noted that the operation of this feature of the system is not dependent upon any measuring or metering action of a pump or similar device, but only upon the creation and maintenance of net fluid pressure differentials proportional to the square of the engine speed. In order to utilize this feature of the invention cooperatively for the production of uniformly proportioned mixtures of fuel and air, by weight, it is necessary to control the effective area of the outlet of the fuel supply duct 54b in accordance with the variable density of the air or fuel-and-air mixture taken into the cylinders of the engine, which is accomplished as follows:

Referring to Fig. 2, the diaphragm 40 and the movable members associated therewith are shown in the positions assumed thereby when the throttle valve 8 is approximately wide open and the pressure in the intake passages of the engine is substantially equal to atmospheric pressure; it being understood that the phrase "pressure in the intake passages" means and shall hereinafter mean the pressure of the fuel and air mixtures in said passages on the low pressure side of the throttle valve 8. Under such circumstances, no pressure differential is exerted on the diaphragm, because both sides thereof are subjected to atmospheric pressure; the right hand side by way of the passage 71 and the left hand side by way of the passage 73 which communicates with the above described chamber 70 at the left of the diaphragm 40, Fig. 2. Furthermore, the spring 52 is so designed that it is now at its free height and, therefore, it exerts no force to move the diaphragm. Consequently, the diaphragm and all of its associated movable parts, including the valve 47b, remain at rest in the positions indicated in Fig. 2. If, however, the pressure in the intake passages of the engine is reduced, as by the partial closing of the valve 8, the pressure in the chamber 70 on the left side of the diaphragm will also be reduced, and the constant atmospheric pressure acting on the right side of the diaphragm will force it to the left, until the pressure differential exerted upon it is balanced by the linear increase in the tension of the spring 52 developed by the compression thereof due to the movement of the diaphragm. Obviously, because of the tapered conformation of the valve 47b, the leftward movement of the diaphragm will cause a corresponding reduction in the effective area of the outlet of the duct 54b.

It should here be pointed out that the dimensions of the diaphragm 40 are so chosen, in relation to the characteristics of the spring 52, that the total leftward movement of the diaphragm from the position indicated in Fig. 2, when the pressure in the intake passages of the engine is reduced to a minimum, will be within practical limitations adapted to accurately control the outlet of the duct 54b through adequate movement of the valve 47b. In the design illustrated, the total diaphragm movement provided for is approximately $\frac{5}{16}$ inch, which may be either increased or decreased as desired. Furthermore, the diameter of the duct 54b and the size and taper of the valve 47b are so chosen that the effective area of the duct has a suitable value when the conditions are as pointed out and explained in connection with Fig. 2, and so that when the diaphragm is moved to its extreme left-hand position, determined on the theoretical assumption of zero pressure in the intake passages of the engine, the outlet of said duct will just be closed completely; the spring 52 being so designed that its tension under this condition will balance the otherwise unopposed pressure of the atmosphere (14.7 pounds per square inch absolute) acting on the right-hand side of the diaphragm 40, Fig. 2. In the design here shown, it is the intention that the diameter of the duct 54b should be about $\frac{3}{32}$ inch, though this value may be altered in either direction as found desirable. Attention is also called to the fact that, for illustrative purposes, the taper of the valve 47b is somewhat exaggerated in the accompanying drawings. Actually, in the design shown the taper would be more gradual, in the neighborhood of $\frac{3}{8}$ inch per foot on the diameter, which is difficult to visualize in short lengths. Furthermore, the taper of the valve 47b is preferably, though not necessarily, straight throughout its length; that is, the valve 47b is truly conical, and its maximum diameter (at the right-hand end, Fig. 2) may be made slightly greater than the diameter of the duct 54b, so as to insure an accurate fit when the valve is in its extreme left-hand position, Fig. 2, without necessitating close manufacturing tolerances.

In the case of representative automotive installations, when the valve 47b and the duct 54b are designed in approximate conformity with the above specifications, the largest annular passage required at the outlet end of the duct will not generally exceed about five to ten thousandths of an inch in width, and, therefore, the area of that passage and of each of the smaller annular passages formed at the same point by the valve 47b, as the latter is moved toward the left, Fig. 2, is very closely equal to the width of such passage multiplied by its mean circumference. Consequently, with a straight tapered valve 47b, the variable effective area of the outlet of the duct 54b is substantially directly proportional to the extent of the longitudinal movement of said valve from its closed position. That is, if the valve is moved one-quarter of the distance from its closed position toward its maximum open position, as shown in Fig. 2, the effective area of the duct will then be one-fourth of its maximum effective area, as indicated in Fig. 2; also, if the valve is moved one-half of the distance from its closed position toward its maximum open position, the effective area of the duct will then be one-half of its maximum effective area; and so on.

It is, moreover, obvious that, because of the previously described relationship between the characteristics of the spring 52 and the diaphragm 40 which is operatively connected with the valve 47b, the extent of the longitudinal movement of the latter from its closed position is directly proportional to the absolute pressure in the intake passages of the engine; that is, if the absolute pressure in said passages is one-fourth of atmospheric pressure, the valve 47b will be moved by the diaphragm 40 one-fourth of the distance from its closed position toward its maximum open position as shown in Fig 2, where the intake pressure is assumed as substantially equal to full atmospheric pressure; also, if the absolute pressure in said intake passages is one-half of atmospheric pressure, the valve 47b will be moved by the diaphragm 40 one-half of the distance from its closed position toward its maximum open position; and so on.

It is, therefore, apparent that means are provided by the invention for varying the effective area of the duct 54b in straight-line relationship with the engine intake pressure, that is, in direct ratio to the first power of the absolute pressure in the intake passages of the engine, because, as shown above, the movement of the valve 47b from its closed position is directly proportional to said absolute pressure, and the effective area of said duct is also directly proportional to said valve movement. In other words, when the absolute pressure in the intake passages of the engine is equal to one-fourth of atmospheric pressure, the effective area of the duct 54b is equal to one-fourth of the maximum effective area of said duct when the conditions are as explained in connection with Fig. 2; also, when the absolute pressure in said intake passages is equal to one-half of atmospheric pressure, the effective area of the duct 54b is equal to one-half of the maximum effective area of said duct as indicated in Fig. 2; and so on. This is another of the vital features of the present invention.

Still referring to Fig. 2, let it be assumed that the prevailing conditions are as there shown and as previously specified herein, namely, that the absolute pressure in the intake passages of the engine is substantially equal to atmospheric pressure and that as a consequence the valve 47b is in its extreme right-hand normal operating position, with the result that the annular opening formed thereby at the outlet of the duct 54b has its maximum normal value, which may be readily computed in a manner hereinafter explained. It will be understood that the area of this maximum outlet is so determined that when the engine is running at a specified speed, as for example, 1000 R. P. M., the fuel flow through said duct per unit of time will be in proper quantity, when mixed with the weight of air at atmospheric pressure drawn in by the engine during the same time unit, to produce an air and fuel mixture of definite ratio desirable for economy of operation, as for example, 18 to 1 by weight.

Let it now be assumed that the engine speed is doubled, that is, that it is increased to 2,000 R. P. M., by reducing the load thereon, while the absolute pressure in its intake passages is still maintained at substantially atmospheric pressure. Under such circumstances, the weight of air drawn in by the engine during a unit of time is obviously approximately twice as great as when the speed was 1,000 R. P. M. The quantity of fuel flow through the duct 54b during the same time unit is also twice as great, because the valve 47b remains in its extreme right-hand position, Fig. 2, thus maintaining the same area of outlet, but when the engine speed is doubled the velocity of the fuel flow is also doubled, for, as previously shown, it is automatically varied, in accordance with the invention, in direct ratio to the first power of the engine speed. Consequently, the mixture of air and fuel remains substantially uniform at the unchanged ratio of 18 to 1.

Similarly, if all other conditions are the same as above described, but if the load on the engine be increased sufficiently to reduce its speed from 1,000 R. P. M. to 500 R. P. M., the weight of air drawn into its intake passages per unit of time will be reduced by fifty percent and the quantity of fuel flow during the same period will also be reduced by fifty percent, because, in accordance with the invention, the velocity of flow is only half as great as at 1,000 R. P. M. of the engine. Again, therefore, the ratio of fuel to air will remain unaltered.

Thus, it is apparent that, as long as the pressure in the intake passages of the engine is maintained closely equal to atmospheric pressure, there will be no appreciable alteration in the composition of the air and fuel mixture delivered by the system of the invention to the engine, throughout the speed range thereof.

Generally, however, the pressure in the intake passages of an engine is below atmospheric pressure (14.7 pounds per square inch absolute) dropping at times as low as one to two pounds per square inch absolute. Of course, when the pressure of the intake air is reduced, its density and, so, its weight per cubic unit is also reduced, and, therefore, the fuel supply must be controlled accordingly in order to maintain a uniform mixture of desirable ratio, as for example 18 to 1. As the net displacement of an engine never changes, the weight of air drawn in by it per revolution is, under uniform temperature conditions, directly proportional to the absolute pressure in its cylinders at the termination of their intake strokes, because the density and, therefore, the weight of air per cubic unit varies directly as its absolute pressure. Furthermore, actual tests have shown that for all practical fuel supply purposes the terminal intake pressure in the cylinders may be considered as substantially equal to the pressure in the intake passages of a properly designed engine.

Accordingly, the system of the present invention also provides for control of the fuel supply in direct ratio to the absolute pressure in the intake passages of the engine, through the medium of the diaphragm 40 and the valve 47b, which are cooperatively associated with the previously described speed responsive fuel control.

Again referring to Fig. 2, it is obvious from what has preceded that, as the effective area of the duct 54b is automatically varied, in accordance with the invention, by the valve 47b in direct ratio to the absolute pressure of the air in the intake passages of the engine, the fuel supply at any given engine speed is reduced in direct proportion as the air density or weight per cubic unit is reduced, and vice versa, because the volume of fuel flow is equal to a constant factor multiplied by the product of the effective area of said duct and the velocity of fuel flow; said velocity remaining constant as long as the engine speed is unaltered.

For example, let it be assumed that the engine is running at a speed of 1,000 R. P. M. and that all other conditions are as previously specified in connection with Fig. 2, the pressure in the intake passages of the engine being substantially equal to atmospheric pressure and the valve 47b being in its normal maximum open position. If the intake pressure is now reduced to one-half atmospheric pressure, as by the partial closing of the throttle valve 8, while the engine speed is maintained at 1,000 R. P. M. by reduction of the load thereon, the weight of air drawn into the engine per unit of time will be reduced by fifty percent, because its density is reduced by fifty percent. The quantity of fuel flow in the same time unit will also be reduced by fifty percent, because, according to the invention, the velocity of flow remains unaltered as the engine speed is constant, but the effective area of the duct 54b is reduced by fifty percent due to a corresponding reduction in the pressure in the intake passages of the engine. Consequently, the consistency of the air and fuel mixture delivered to the engine remains unchanged at the original ratio, as for example 18 to 1.

Similarly, if the pressure in the intake passages of the engine is reduced from atmospheric pressure, as assumed in Fig. 2, to one-fourth of atmospheric pressure, while the engine speed is still held constant at 1,000 R. P. M., only one-fourth the weight of air will be drawn into the engine per unit of time, because its density is reduced proportionately. The quantity of fuel flow during the same time unit will also be reduced to one-fourth of the original quantity, because the effective area of the duct 54b is reduced to one-fourth of its former area, Fig. 2, and the velocity of flow remains constant, as there is no change in engine speed. Again, therefore, the ratio of air to fuel is held constant, as at 18 to 1, for example, and obviously this ratio of air to fuel by weight will remain unaltered throughout the entire pressure range in the intake passages of the engine, as long as the engine speed is maintained constant at 1,000 R. P. M. It is also equally apparent that the same result would be obtained if any engine speed other than 1,000 R. P. M. had been assumed.

Let it now be assumed that the conditions are as shown in Fig. 2 and as previously specified in connection therewith. Under such circumstances, it has been demonstrated herein that the system of the invention automatically maintains a fixed ratio of air to fuel in the mixtures thereof delivered to the engine, throughout its entire speed range, as long as the pressure in its intake passages is held substantially equal to atmospheric pressure. It has also been demonstrated in the immediately preceding paragraphs that at any given engine speed and, therefore, at all speeds, the air to fuel ratio which is maintained by the system, with atmospheric pressure in the intake passages of the engine, is also maintained when the pressure in said passages is altered to any other pressure.

For example, if an engine is running at 600 R. P. M. under the conditions indicated in Fig. 2, with substantially atmospheric pressure in its intake passages, and if a definite air to fuel ratio, as for instance 18 to 1, is then maintained, the same ratio will still be maintained, if the speed of the engine is increased to 1,200 R. P. M., providing that the pressure in its intake passages is unaltered. This is because the weight of air drawn into the engine per unit of time will then be doubled and the quantity of fuel flow during the same time unit will also be doubled, for, while the effective area of the duct 54b is unchanged, the velocity of fuel flow is doubled due to the increase in engine speed from 600 to 1,200 R. P. M. The ratio of air to fuel is, therefore, maintained at 18 to 1. If the pressure in the intake passages of the engine is now reduced to half of atmospheric pressure while the speed is held at 1,200 R. P. M., the weight of air drawn into the engine per unit of time will be reduced by fifty percent, because its density is only half as great as at atmospheric pressure. The quantity of fuel flow during the same time unit will also be reduced by fifty percent, for while the velocity of fuel flow is unchanged, because of no alteration in engine speed, the effective area of the duct 54b is reduced by fifty percent through the medium of the valve 47b and diaphragm 40 due to the fifty percent reduction in pressure in the intake passages of the engine. Consequently, there is again no change in the air to fuel ratio of 18 to 1.

It is now apparent that through control of the velocity of fuel flow in direct ratio to the first power of the engine speed, independently of the effective area of the fuel supply duct 54b, and through coöperative control of the effective area of said duct in direct ratio to the first power of the pressure in the intake passages of the engine, the system of the invention provides positive means for producing and constantly maintaining any desired ratio of air to fuel by weight in the mixtures thereof delivered to the engine, regardless of any and all variations in the speed of the engine and in the pressure of the air supplied to its intake passages, that is, under all possible variations in operating conditions. This means that maximum economy of operation is always assured. It also means that the full power which the engine is capable of developing with a fuel and air mixture of the selected ratio is always available and may be obtained by the operator when desired simply by opening the throttle valve and thus filling the intake passages of the engine with a continuous powerful charge of fuel and air at atmospheric pressure, which is especially desirable in the case of automotive engines for accelerating and hill climbing, in contrast with ordinary systems wherein the opening of the throttle valve, from a partially closed position, actually so weakens the fuel and air mixture that the pick-up in power is comparatively slow and sluggish, particularly at low speeds.

In order to illustrate the above principles specifically, and in order to show how the effective area of the duct 54b and the taper of the valve 47b may be computed, the following example is given. It shall be understood that this example is stated for illustrative purposes and that the invention is not to be limited thereto.

Let it be assumed that the system of the invention is to be used with an eight-cylinder four-cycle automotive engine, having a cylinder bore of $3\frac{1}{16}$ inches and a stroke of $3\frac{3}{4}$ inches. Let it also be assumed that the engine crank shaft makes 3,000 revolutions per mile travelled by the vehicle which it drives. The net piston displacement of such an engine is 110.5 cubic inches per revolution; the nominal displacement being twice as great namely 221 cubic inches. If the speed of the vehicle is 60 miles per hour, the engine speed is 3,000 R. P. M. or 50 R. P. S. (revolutions per second). Also, if the impeller shaft 31a is rotated at the same speed (50 R. P. S.) and if the diameter of the impeller chamber 27 is $3\frac{1}{16}$ inches, the fuel pressure developed in the discharge passage 38 from said chamber will amount to 8 pounds per square inch, as may be readily calculated by well-known methods on the assumption that the fuel used is gasoline with an average specific gravity of 0.70. This pressure, 8 pounds per square inch is equivalent to a head of $26\frac{2}{3}$ feet of gasoline, which is the net head causing flow through the duct 54b, because according to the illustrated form of the invention, fuel is supplied to the impeller at substantially atmospheric pressure and the same pressure is maintained around the outlet of said duct 54b. With this net head of $26\frac{2}{3}$ feet acting on the fuel, its velocity of flow through the outlet of the duct 54b will be $41\frac{1}{3}$ feet or 496 inches per second as may be readily calculated by the well-known formula $V=\sqrt{2gh}$.

Now, if the vehicle runs 24 miles per gallon of fuel consumed, the volume of fuel used per mile is 1/24 gallon or 1/24 of 231 cubic inches=9.625 cubic inches. As the engine makes 3,000 revolutions per mile, the volume of fuel consumed per revolution is 9.625÷3,000=.003208 cubic inch, and at 60 miles per hour, the volume of fuel consumed per second is .003208×50=.1604 cubic inch or .00401 pound. Also, if it is desired to maintain a ratio of air to fuel mixture of 18 to 1 by weight, the weight of air consumed per second is $$18 \times .00401 = .0722$$

pound.

With an outlet or orifice of the general type shown in the illustrated embodiment of the present invention, the volume of fuel flow through the outlet of the duct 54b is equal to the effective area of said outlet multiplied by the velocity of flow therethrough multiplied by a constant factor of 0.7, and, therefore, we have $$.1604 = A \times 496 \times 0.7$$

where A is the effective area in square inches. Whence, A=.00046 square inch. Now, as previously explained the area of a narrow annular passage is equal to its width, $w$, multiplied by its mean circumference, which in the case of a 3/32 inch diameter duct, 54b, is closely equal to 0.3 inch. Consequently, $$A = .00046 = .3w. \text{ Whence, } w = .0015 \text{ inch}$$

Now, as previously shown, the net piston displacement of the engine is 110.5 cubic inches per revolution, and, therefore, at 3,000 R. P. M. the net displacement per second=50×110.5=5525 cubic inches or 3.2 cubic feet, which volume of air at atmospheric pressure of 14.7 pounds per square inch weighs 3.2×.075=0.24 pound, but the weight of air actually taken in by the engine per second is, as previously shown, only .0722 pound.

Consequently, the density of the air in the intake passages of the engine is considerably less than that of free atmospheric air, under the assumed conditions of operation. Because the weight of air actually consumed by the engine is closely proportional to the absolute pressure in its intake passages at constant speed, we have, Pressure in intake passages=

$$14.7 \times \frac{.0722}{.24} = 4.42$$

pounds per square inch absolute.

With a pressure of 4.42 pounds per square inch in the intake passages of the engine acting on the diaphragm 40, Fig. 2, the valve 47b is at a distance of $$\frac{4.42}{14.7} = .3$$

of its total travel from its closed position. If its total travel is 1/16 inch or 10/32 inch, the valve is now at a distance of .3×10/32=3/32 inch from its closed position, and as shown the width of the annular passage is now .0015 inch. Consequently, as the taper of the valve 47b is straight and as the width of each annular passage formed thereby is, therefore, proportional to the distance of said valve from its closed position, we have, $w':w=10:3$ whence, $w'=.005$ inch, where $w'$ is the width of the annular passage formed by the valve 47b when it is in its maximum normal open position, which is assumed when the pressure in the intake passages of the engine is substantially equal to atmospheric pressure. In this position, the valve is at a distance of 1/16 inch from its closed position, according to the assumed design, and, therefore, the taper of the valve must be equal to .005 inch in 1/16 inch, which is equivalent to a taper of approximately 1/16 inch per foot on the radius, or 3/8 inch per foot on the diameter.

In the preceding paragraphs it has been shown that, during normal operation, the system of the invention positively supplies a fuel and air mixture of constant ratio, by weight, to the engine with which it is connected, regardless of variations in speed and intake manifold pressure, that is, regardless of all possible changes in operating conditions, including the arbitrary opening and closing of the throttle valve 8. It has also been shown that any ratio of air to fuel, as 18 to 1 or 16 to 1, etc., which is considered most desirable for economy and general performance may be selected and maintained, simply by the proper proportioning of the valve 47b, and more specifically by merely altering the taper thereof.

Under extraordinary circumstances, however, it frequently becomes desirable to temporarily supply an engine with mixtures of fuel and air which are richer in fuel than the fixed ratio mixture normally supplied by the system. When richer mixtures are used, economy of operation is sacrificed but more power is obtained, and, therefore, such mixtures are only desirable at certain times, as when exceptionally rapid acceleration is required, or when an engine is overloaded, as in the case of a motor car climbing a steep hill. Generally, it is also necessary to use a considerably enriched mixture when starting an engine and a slightly enriched mixture thereafter, when the outside temperature is unusually low, at least until the engine becomes thoroughly heated. Accordingly, various methods are provided by the invention for thus enriching the fuel and air mixtures supplied by it, at such times and in such degree as may be considered desirable or necessary.

Preferred methods of accomplishing the above object are shown in Figs. 2, 5 and 7. Referring first to Fig. 2 and assuming that the valve 47b has been properly adjusted longitudinally, by means of the nut 46, for normal conditions including temperature, let it be assumed that bad winter conditions are now to be encountered and that it is, therefore, desirable to use somewhat enriched mixtures of fuel and air. If the nut 46 is backed off slighly toward the right, it will move the valve 47b toward the right also, thus increasing the area of the annular outlet of the duct 54b. The quantity of fuel flow per unit of time will thus be increased proportionately, not only when the valve is in its new adjusted position, but also in all positions throughout the extent of its longitudinal movement, as controlled by the diaphragm 40 and spring 52. Obviously, however, the percentage of enrichment will decrease slightly as the valve is moved from its idling position toward its maximum open position, which is desirable because less enrichment is required as the engine power increases. This adjustment is not essential but may be desirable in certain cases as a more or less permanent adjustment for the winter months.

Additional uses and advantages of the longitudinal adjustability of the valve 47b, as above described, are as follows:

When a change is made in the grade of fuel used in an engine, as from regular to high-test gasoline, the ratio of the air to fuel mixture formed in the chamber 3 may be altered accordingly, if desired, by screwing the nut 46 slightly toward the left, Fig. 2, so as to cause the valve 47b to reduce the variable area of the annular outlet of the duct 54b, and thus reduce the richness of the mixture, from, say, 16 to 1 to 18 to 1, with a resultant increase in economy.

When the throttle valve 8 is correctly positioned for idling, the speed of the engine may be brought within desirable limits by slightly adjusting the valve 47b longitudinally by means of the nut 46, thus altering the quantity of fuel flow per time unit. Such an adjustment will not interfere with the previously described adjustments, because it will be in unison with them. Actually all other adjustments of the valve 47b may best be made simply by the proper regulation of the idling speed of the engine by means of the nut 46.

Clearly, the longitudinal adjustability of the valve 47b, by means of the nut 46, eliminates the necessity for the maintenance of close manufacturing tolerances, because the valve may be brought into any desired longitudinal position through this adjustment, regardless of reasonable variations in the dimensions of all parts involved in the determination of such position. Furthermore, as the nut 46 is readily accessible at all times, valve adjustments may be made while the engine is running and the mechanism of the invention is functioning, which is obviously most desirable, especially when regulating idling speed.

When there is a substantial reduction in the density of the atmosphere in which an engine operates, as when a motor vehicle ascends from sea-level to an altitude of several thousand feet, the fuel and air mixtures supplied to the engine become enriched automatically, whether supplied by the system of the present invention or the systems now in general use. The longitudinal adjustment provided for the valve 47b obviously affords simple means for compensating for such changes in air density, that is, for maintaining the same ratio of air to fuel at any altitude. For example, if, due to increased altitude, the absolute pressure of the atmosphere is reduced to 75% of its sea-level value of 14.7 pounds per square inch, it is merely necessary to screw the nut 46 toward the left, Fig. 2, with the throttle valve 8 in its idling position, until the engine speed is brought to the proper value.

The spring 52 will then be compressed to only 75% of its idling height corresponding to sea-level atmospheric pressure. The absolute pressure in the intake passages of the engine, when idling, will, however, be unaltered and, therefore, the air to fuel ratio of the mixture supplied to the engine will also be unchanged. This same ratio will, moreover, be maintained as the pressure in the intake passages of the engine is increased until it reaches full atmospheric pressure of 75% of sea-level value, when the valve 47b will be at a distance of 75% of its full travel from its closed position. In this position of the valve 47b, the area of the annular outlet of the duct 54b is 75% of the area corresponding to sea-level conditions and, therefore, the flow of fuel is reduced 25%, thus conforming with the 25% reduction in air density or weight.

The mechanism illustrated in Figs. 5 and 7 is provided for temporarily enriching the fuel and air mixtures for starting the engine and for rapid acceleration and increased power, which is preferably accomplished by increasing the pressure of the fuel supplied to the intake passage 26, Figs. 2 and 6, of the impeller chamber 27. As previously explained, during normal operation this pressure is maintained substantially equal to atmospheric pressure through the action of the pressure reducing valve 17, which is pressed toward its seat 9a by the adjustable spring 16. As the pump c, Fig. 1, supplies fuel through the pipe 10 to the lower portion of chamber 9 below the valve 17, at a pressure several pounds per square inch above atmospheric pressure, the pressure in the upper portion of chamber 9 and, therefore, in the passage 26 may be readily increased by reducing the normal tension of the spring 16.

This is effected through the medium of the lever 67 and the link or rod 68, which may be actuated manually or automatically, like a "choke" rod, or both manually and automatically as desired. When automatic actuation is desired, the rod 68 may be connected with the starting device used for starting the engine, so that when such device is operative, the rod 68 will be moved toward the right, Figs. 5 and 7, and when it ceases to operate, the rod 68 will be restored to its normal position as indicated in the figures just mentioned. As is obvious from Fig. 7, when the rod 68 is moved to the right by either manual or automatic means, the lever 67 is rotated in a clockwise direction about the shaft 6 which raises its angularly extending arm 67b in a more or less vertical direction, thus pushing the rod 25 upward against the downward pressure of the lever or beam 18, which is normally held in the position indicated in Fig. 7 by the spring 22 which has more than sufficient force to overcome the maximum opposing tension of the spring 16 and all frictional resistances. The upward movement of the rod 25 clearly causes the beam 18 to rotate in a counterclockwise direction about the pivot formed by the upper pin in the link 19, and such rotation causes the rod 14 which is loosely pinned to the beam to be pulled upward, thus reducing the tension of the spring 16 which permits the pressure in the upper portion of chamber 9 to increase in proportion to said reduction in tension. This increase in pressure is transmitted through the passage 26 to the impeller chamber 27 and so supplements the pressure developed therein by the rotation of the impeller 31. Consequently, the velocity of fuel flow through the duct 54b will be increased and the fuel and air mixtures will be enriched accordingly. Obviously, when the movement of the rod 68 is reversed and the lever 67 is restored to its original position, the spring 22 will return the beam 18 and all connected parts to the position indicated in Fig. 7.

The system of the present invention also provides means for enriching the fuel and air mixtures produced thereby through the movement of the rod or link 66 which directly controls the throttle valve 8 by the lever 65, which is non-rotatably secured to the shaft 6. Preferably, when the throttle valve is nearly wide open, as shown in Figs. 2 and 5, the auxiliary lever 69, which is also non-rotatably secured to the shaft 6, comes into engagement with the extension 67a of the lever 67, as the shaft 6 is rotated in a clockwise direction, Fig. 5. Further rotation of the shaft 6 in the same direction then causes the lever 67 to rotate with said shaft as a unit, with the result that its arm 67b is raised, thus lifting the rod 25 and reducing the tension of the spring 16 in the manner previously described. This increases the pressure of the fuel delivered to the duct 54b and, therefore, also increases the velocity of fuel flow therethrough, all as fully explained above, thus enriching the fuel and air mixture delivered to the engine, the extent of such enriching action obviously depending upon the extent of the clockwise rotation of the shaft 6 from its position as indicated in Fig. 5. It should here be noted that when the lever 69 begins to rotate the lever 67 as above described the excess tension of the spring 22 must be overcome, and this automatically notifies the operator that the mixture-enriching operation has been started.

This arrangement of the control mechanism is desirable, because it insures the maintenance of a constant-ratio, highly economical mixture of fuel and air at all times, until the throttle valve is nearly wide open, and then if additional pressure is exerted on the throttle control rod, or "accelerator pedal" in the case of an automotive engine, said mixture is gradually enriched to any degree desired, as the throttle valve is opened still wider. This obviously provides for the development of maximum engine power and, therefore, a maximum rate of acceleration whenever required, with the least possible loss in general economy of operation.

Referring to the modification of my invention illustrated in Fig. 9, the aforesaid tube 51 is shown as extending through a passage in a structure 85 which is suitably secured to said tube 51, as by the pin 86. The structure 85, below the tube 51, is circular in horizontal section and comprises a passage 87 which communicates with the discharge port 55 of the tube 51. In turn, the passage 87 communicates with a plurality of radially extending passages 88, each terminating just beyond the exterior surface of the structure 85 in a boss 88a.

Suitably secured, as by soldering, to the circular part of the structure 85, immediately below the tube 51, is the inner circular section of a ring 89 which defines a circular series of passages 89a. Secured by soldering or in other suitable manner to the ring 89 is the ring section of a funnel-like member 90. It will be observed that the lower end of the member 90 forms an annular channel 91 with the adjacent circular surface of the structure 85, this channel opening, at its lower end into the mixing chamber 3 and being in free communication with the passages 89a of the ring 89.

Coactable with the lower surface of the upper ring section of the funnel 90 is a ring valve 92 which, generally, is similar to the valve 60 hereinbefore described, the outer surface of said valve 92 snugly engaging the interior housing surface. A light spring 61 seated as hereinbefore described coacts with the lower surface of the valve 92 to hold it in seated position as shown.

The operation of the atomizing device shown in Fig. 9 is substantially the same as hereinbefore described with respect to Figs. 2 and 3. When the engine with which said atomizing device of Fig. 9 is running at slow speed under light load, a stream of air passes exclusively through the ring passages 89a and channel 91, and atomizes the liquid fuel issuing from the passages 88. Should a greater amount of air be drawn into the engine, the valve 92 moves downwardly in response to the increased pressure differential to thereby open another circular passage through which air passes through the mixing chamber with subsequent entrainment of fuel therein. Although the valve 92 thus opens, a stream of air continues to pass through the ring passages 89a and channel 91.

In the modification shown in Fig. 10, a member 94 is shown as secured to that end of the valve 47 at the right, this member 94 extending freely through passages provided respectively therefor in the disk 48 and cover member 72. It will be understood that the member 94 may be extended to some location convenient to the operation of the engine so that it may be pulled, when desired, to such extent as may be desirable to move the valve 47 from left to right, Fig. 2, and temporarily enrich the fuel mixture entering the mixing chamber by increasing the effective area of the fuel orifice. Obviously, when released, the spring 49 automatically restores the valve 47 to its normal operating position.

As hereinbefore stated, the nut 46, Fig. 2, may be rotated in one direction or the other to thereby move the valve 47 to vary the effective area of the orifice with which the valve member 47b coacts. Alternatively, the valve 47 may remain stationary and the effective area of said orifice adjusted by an arrangement as shown in Fig. 11 wherein the tube 51 is shown as having an open end seated in the housing wall. Threaded in an internally threaded passage 95 of the housing wall is a screw 96 having a tubular member 96a extending therefrom, this tubular member 96a being telescopically related in slidable relation to the aforesaid open end of the tube 51 and communicating therewith. Packing 97 is disposed in the space at the end of said tube 51 and held under compression by a spring 98 coiled around the tubular member 96a. The hereinbefore described passage 38 from the impeller chamber 27 communicates with a chamber 39a (corresponding with the hereinbefore described chamber 39), said chamber 39a communicating with the passage defined by said tubular member 96a.

It will be understood, in view of the foregoing description, that the passage defined by the tubular member 96a corresponds with the hereinbefore described passage or duct 54b and that the end of said tubular member 96a toward the right, Fig. 11, constitutes the orifice or most restricted area thereof, this being controlled by the valve member 47b.

With the arrangement of Fig. 11, when it becomes desirable to vary the effective area of the orifice or restricted area last named, the closure screw 99 is removed whereupon the screw 96 is adjusted in one direction or the other to thereby move the tubular member 96a and said last named orifice or restricted area longitudinally with respect to the valve member 47b to vary the effective area thereof.

Referring to Fig. 12, I have shown a passage 100 of conical form which flares in a direction opposite to the flare of the valve member 47b. This is illustrative of the configuration which may be taken, if desired, of the passage or duct which leads toward and in which the hereinbefore described orifices or restricted areas terminate. It will be understood that duct configuration of this character reduces frictional losses due to the passage of liquid fuel through the duct.

It will be understood that the illustrated embodiment of the present invention and the modifications thereof, as described in the foregoing specification, are merely representative of the several features of the present invention, and are not to be considered as in any way limiting the scope and application of the principles and spirit thereof. Obviously, many additional modifications in design and general arrangement of apparatus may be made without departing from said principles and spirit, as for example, the following:

Instead of the fuel duct 54b and valve 47b, any type of fuel inlet passage and any design of valve for controlling said passage may be employed, providing that the effective area of the orifice of said passage is varied in direct ratio to the movement of said valve, as governed by the diaphragm or piston 40. Thus, the orifice or outlet of said passage may be in the form of a straight narrow rectangular slot parallel to the line of travel of the valve, which may be of the slide type, adapted to completely cover said slot when in a closed position, corresponding to zero intake manifold pressure, and to gradually uncover the length of said slot in direct ratio to the increase in said intake pressure.

It is also apparent that if a valve and duct similar to 47b and 54b are employed, the orifice controlling the flow of fuel need not be at the end of said duct as indicated in Fig. 2, but may be at any point selected throughout the length of said duct as determined by the configuration thereof. Thus if the right-hand end of the duct 54b, Fig. 2 is beveled, at say 45°, the orifice will be located at the point interior of said duct where the bevel meets the cylindrical wall thereof.

Furthermore, it is obvious that the same operating effect and proportional variation of effective area of the fuel duct 54b may be obtained, if the interior cylindrical form thereof be changed to a conical bore with its large end toward the right, Fig. 2, and if the valve 47b is altered in shape from a cone to a cylinder.

Furthermore, it is obvious that the fuel proportioning apparatus functions independently of the passage 54a, providing that a constant pressure, such as atmospheric pressure be maintained around the outlet of the duct 54b. Consequently, the portion of the tube 51 to the right of the duct 54b, Fig. 2, may be cut away and dispensed with; the fuel issuing from the duct 54b being permitted to flow directly into the chamber 3, or being led through any of the well-known atomizing devices in present use.

It is also apparent that instead of atmospheric pressure, any other substantially constant pressure, such as the pressure developed by a supercharger, may be maintained in the upper portion of chamber 3 around the outlet of the duct 54b, and the fuel delivery apparatus will still function as described in the preceding specification, providing that the pressure of the fuel supplied to the impeller chamber 27 through the duct 26 also be altered from atmospheric pressure to supercharger pressure so as to neutralize or balance the change in pressure in the upper portion of said chamber 3.

While the invention has been described with respect to a certain particular preferred example which gives satisfactory results, it will be understood by those skilled in the art after understanding the invention, that various changes and modifications may be made without departing from the spirit and scope of the invention and it is intended, therefore, in the appended claims to cover all such changes and modifications.

What is claimed as new and desired to be secured by Letters Patent is:

1. In a device for supplying liquid fuel and air to an internal combustion engine, a fuel discharge orifice, means for altering the effective area of said orifice in direct ratio to absolute engine intake pressure, and a centrifugal pump adapted to supply fuel to the inlet of said orifice at a pressure proportional to the square of the engine speed, the arrangement being such that said last-mentioned pressure is substantially wholly dissipated in imparting velocity to the fuel discharged through said orifice.

2. In a device for supplying liquid fuel and air to an internal combustion engine, a fuel discharge orifice, means for altering the effective area of said orifice in substantially straight-line relationship with variations in the absolute pressure in the engine intake passages, and a pump adapted to deliver fuel through said orifice, irrespective of alteration in the effective area thereof, at a velocity varying in substantially straight-line relationship with the engine speed.

3. In a device for supplying liquid fuel and air to an internal combustion engine, a fuel discharge orifice, a valve controlling the effective area thereof, pneumatic means adapted to move said valve in substantially straight-line relationship with variations in the absolute pressure in the engine intake passages, and a pump adapted to deliver fuel through said orifice, irrespective of alteration in the effective area thereof, at a velocity varying in substantially straight-line relationship with the engine speed.

4. Apparatus for supplying liquid fuel and air to an internal combustion engine comprising a power-driven fuel supply pump, a centrifugal fuel delivery pump, means connecting the discharge of said supply pump with the inlet of said delivery pump, and pressure reducing means interposed in said connecting means between said pumps.

5. Apparatus for supplying liquid fuel and air to an internal combustion engine comprising a power-driven fuel supply pump, a centrifugal fuel delivery pump, means connecting the discharge of said supply pump with the inlet of said delivery pump, pressure reducing means interposed in said connecting means between said pumps, a discharge orifice for said delivery pump, and means for altering the effective area of said orifice in straight-line relationship with variations in engine intake pressure.

6. In a device for supplying liquid fuel and air to an internal combustion engine, a fuel discharge orifice, means for altering the effective area of said orifice in substantially straight-line relationship with variations in the absolute pressure in the engine intake passages, a pump adapted to deliver fuel through said orifice, irrespective of alteration in the effective area thereof, at a velocity varying in substantially straight-line relationship with the engine speed, a throttle controlling the engine air supp.y, a manually operable mechanism for actuating said throttle, and means actuated by said mechanism when said throttle is opened beyond a predetermined position for increasing the pressure of the fuel delivered to the inlet of said orifice to thereby enrich the fuel-and-air mixture supplied to the engine.

7. A device in accordance with claim 6 wherein auxiliary means operative independently of the movement and position of the throttle is provided for accomplishing the same purpose as the last-mentioned means of said claim 6.

8. A device for supplying liquid fuel and air to an internal combustion engine, comprising a fuel discharge orifice, a pump adapted to be driven by the engine and to deliver fuel to the inlet of said orifice at a pressure proportional to the square of its speed, pneumatically operable means responsive to absolute engine intake pressure for altering the effective area of said orifice, and calibrated resilient means independent of said pneumatic means and operative in conjunction therewith to alter the effective area of said orifice in direct ratio to absolute engine intake pressure.

9. A device for supplying liquid fuel and air to an internal combustion engine, comprising a fuel discharge orifice, a pump adapted to be driven by the engine and to deliver fuel to the inlet of said orifice at a pressure proportional to the square of its speed, pneumatically operable means adapted to alter the effective area of said orifice in direct ratio to absolute engine intake pressure, a structure forming a chamber communicating with the outlet of said orifice, and a plurality of passages in said structure adapted to discharge fuel from said chamber and to substantially equalize the pressure therein with the pressure exterior of said structure in the region of fuel discharge.

10. In a device for supplying liquid fuel and air to an internal combustion engine, a fuel discharge orifice having its outlet in substantially free communication with the atmosphere, means for altering the effective area of said orifice in direct ratio to absolute engine intake pressure, and means for supplying fuel to the inlet of said orifice at a pressure proportional to the square of the engine speed.

11. In a device for supplying liquid fuel and air to an internal combustion engine, a fuel discharge orifice having its outlet in substantially free communication with the atmosphere, means for altering the effective area of said orifice in direct ratio to absolute engine intake pressure, and means for supplying fuel to the inlet of said orifice at a pressure proportional to the square of the engine speed, the arrangement being such that said last-mentioned pressure is substantially wholly dissipated in imparting velocity to the fuel discharged through said orifice.

12. In a device for supplying liquid fuel and air to an internal combustion engine, a pump adapted to deliver fuel to the engine intake passages and to develop and sustain a fuel pressure differential between its inlet and discharge substantially proportional to the square of the engine speed, means for supplying fuel to the inlet of said pump at substantially constant pressure and for maintaining substantially the same constant pressure around the exterior of its discharge orifice, a valve for altering the effective area of said discharge orifice, and pneumatic means adapted to actuate said valve in substantialy straight-line relationship with variations in engine intake pressure.

13. A device for suplying liquid fuel and air to an internal combustion engine, comprising a fuel discharge orifice, a pump adapted to be driven by the engine and to deliver fuel to the inlet of said orifice at a pressure proportional to the square of its speed, valve means for altering the effective area of said orifice, a freely movable pneumatic member responsive to absolute engine intake pressure adapted to actuate said valve means, and calibrated resilient means independent of said pneumatic member and operative in conjunction therewith to cause said valve means to alter the effective area of said orifice in direct ratio to absolute engine intake pressure.

14. A device for supplying liquid fuel and air to an internal combustion engine, comprising a fuel discharge orifice, a pump adapted to be driven by the engine and to deliver fuel to the inlet of said orifice at a pressure proportional to the square of its speed, pneumatically operable means responsive to absolute engine intake pressure for altering the effective area of said orifice, and calibrated resilient means independent of said pneumatic means and operative in conjunction therewith to alter the effective area of said orifice in direct ratio to absolute engine intake pressure, the effect of said resilient means being substantially zero when the absolute engine intake pressure is at a maximum.

15. A device for supplying liquid fuel and air to an internal combustion engine, comprising a fuel discharge orifice, a pump adapted to be driven by the engine and to deliver fuel to the inlet of said orifice at a pressure proportional to the square of its speed, valve means comprising a slidable valve member for altering the effective area of said orifice, and pneumatic means resiliently balanced by calibrated means independent thereof and adapted to move said slidable valve member in straight-line relationship with variations in absolute engine intake pressure.

16. A device for supplying liquid fuel and air to an internal combustion engine, comprising a fuel discharge orifice, a pump adapted to be driven by the engine and to deliver fuel to the inlet of said orifice at a pressure proportional to the square of its speed, straight-tapered valve means comprising a slidable valve member for altering the effective area of said orifice, and pneumatic means resiliently balanced by calibrated means independent thereof and adapted to move said slidable valve member in straight-line relationship with variations in absolute engine intake pressure.

17. A device for supplying liquid fuel and air to an internal combustion engine, comprising a fuel discharge orifice, a pump adapted to be driven by the engine and to deliver fuel to the inlet of said orifice at a pressure proportional to the square of its speed, pneumatically operable means for altering the effective area of said orifice in response to the combined action of absolute engine intake pressure and atmospheric pressure, and calibrated resilient means independent of said pneumatic means and operative in conjunction therewith to alter the effective area of said orifice in direct ratio to absolute engine intake pressure.

18. A device for supplying liquid fuel and air to an internal combustion engine, comprising a fuel discharge orifice, a pump adapted to be driven by the engine and to deliver fuel to the inlet of said orifice at a pressure proportional to the square of its speed, pneumatically operable means for altering the effective area of said orifice in response to the combined action of absolute engine intake pressure and a substantially constant pressure, and calibrated resilient means independent of said pneumatic means and operative in conjunction therewith to alter the effective area of said orifice in direct ratio to absolute engine intake pressure.

19. A device for supplying liquid fuel and air to an internal combustion engine, comprising a fuel discharge orifice, a pump adapted to be driven by the engine and to deliver fuel to the inlet of said orifice at a pressure proportional to the square of its speed, pneumatically operable means for altering the effective area of said orifice in response to the combined action of absolute engine intake pressure and a substantially constant pressure, and calibrated resilient means independent of said pneumatic means and operative in conjunction therewith to alter the effective area of said orifice in direct ratio to absolute engine intake pressure, the effect of said resilient means being substantially zero when the absolute engine intake pressure is substantially equal to said constant pressure.

20. A device for supplying liquid fuel and air to an internal combustion engine, comprising a fuel discharge orifice, valve means for altering the effective area of said orifice, a pump adapted to be driven by the engine and to deliver fuel to the inlet of said orifice at a pressure proportional to the square of its speed, a structure forming a chamber communicating with the outlet of said orifice, a plurality of passages in said structure adapted to discharge fuel from said chamber and to substantially equalize the pressure therein with the pressure exterior of said structure in the region of fuel discharge, and pneumatic means located exteriorly of said chamber and adapted to actuate said valve means to alter the effective area of said orifice in direct ratio to absolute engine intake pressure.

21. A device for supplying liquid fuel and air to an internal combustion engine, comprising a housing forming an air passage in substantially free communication with the atmosphere, a fuel conduit in said housing having a discharge orifice, a pump adapted to be driven by the engine and to deliver fuel to said conduit at a pressure proportional to the square of its speed, pneumatically operable means adapted to alter the effective area of said orifice in direct ratio to absolute engine intake pressure, a structure in said passage forming a chamber communicating with the outlet of said orifice, and a plurality of passages in said structure adapted to discharge fuel from said chamber and to substantially equalize the pressure therein with the pressure in said passage.

22. A device for supplying liquid fuel and air to an internal combustion engine, comprising a fuel discharge orifice, valve means for altering the effective area of said orifice, a pump adapted to be driven by the engine and to deliver fuel to the inlet of said orifice at a pressure proportional to the square of its speed, a structure forming a chamber communicating with the outlet of said orifice, a plurality of passages in said structure adapted to discharge fuel from said chamber and to substantially equalize the pressure therein with the pressure exterior of said structure in the region of fuel discharge, pneumatic means responsive to absolute engine intake pressure adapted to actuate said valve means, and calibrated resilient means independent of said pneumatic means and operative in conjunction therewith to cause said valve means to alter the effective area of said orifice in direct ratio to absolute engine intake pressure.

23. Apparatus for supplying liquid fuel and air to a variable speed internal combustion engine, said apparatus comprising a mixing chamber having an air inlet orifice and an outlet orifice adapted for connection with the intake manifold of an engine, a fuel delivery duct communicating with said chamber and having an orifice through which liquid fuel is adapted to flow, means adapted to alter the effective area of said duct orifice in substantially direct ratio to the first power of the variable absolute pressure in the intake passages of the engine, means constituting a substantially constant-pressure source of liquid fuel supply, and means receiving the liquid fuel at the specified pressure and supplying the same to said duct orifice under pressure varied and sustained in substantially direct ratio to the square of the speed of said engine throughout the speed range thereof.

24. Apparatus in accordance with claim 23 wherein substantially constant pressure is effective at the outlet end of said duct orifice.

25. Apparatus in accordance with claim 23 wherein substantially atmospheric pressure is effective at the outlet end of said duct orifice.

26. Apparatus in accordance with claim 23 wherein the pressure, in excess of atmospheric pressure, of the liquid fuel at the inlet end of said duct orifice is produced substantially solely by said supply means, substantially atmospheric pressure being effective at the outlet end of said duct orifice.

27. In a device for supplying liquid fuel and air to an internal combustion engine, a centrifugal pump adapted to be driven by the engine, an orifice through which said pump is adapted to discharge fuel for delivery to the engine, a chamber surrounding the exterior of said orifice wherein substantially constant air pressure prevails, and means for delivering fuel to the inlet of said pump at a pressure substantially equal to said constant air pressure.

28. In a device for supplying liquid fuel and air to an internal combustion engine, a centrifugal pump adapted to be driven by the engine, an orifice through which said pump is adapted to discharge fuel for delivery to the engine, a chamber surrounding the exterior of said orifice wherein substantially constant air pressure prevails, a source of fuel supply for said pump under pressure in excess of atmospheric pressure, and a pressure reducing valve connected with said source of supply and adapted to deliver fuel to the inlet of said pump at a pressure substantially equal to said constant air pressure.

29. In a device for supplying liquid fuel and air to an internal combustion engine, a centrifugal pump adapted to be driven by the engine and adapted to discharge fuel into the intake passages thereof, means for supplying fuel to the inlet of said pump at substantially constant pressure, and means for increasing said fuel supply pressure when desired to enrich the fuel-and-air mixture delivered to the engine.

30. In a device for supplying liquid fuel and air to an internal combustion engine, a throttle controlling the air supply, a centrifugal pump adapted to be driven by the engine and adapted to discharge fuel into the intake passages thereof, means for supplying fuel to the inlet of said pump at substantially constant pressure, a manually operable mechanism for actuating said throttle, and means associated therewith for increasing said fuel supply pressure when desired to enrich the fuel-and-air mixture delivered to the engine.

31. In a device for supplying liquid fuel and air to an internal combustion engine, a throttle controlling the air supply, a centrifugal pump adapted to be driven by the engine and adapted to discharge fuel into the intake passages thereof, means for supplying fuel to the inlet of said pump at substantially constant pressure, a manually operable mechanism for actuating said throttle, and means actuated by said mechanism when said throttle is opened beyond a predetermined position for increasing said fuel supply pressure to enrich the fuel-and-air mixture delivered to the engine.

32. In a device for supplying liquid fuel and air to an internal combustion engine, a throttle controlling the air supply, a centrifugal pump adapted to be driven by the engine and adapted to discharge fuel into the intake passages thereof, means for supplying fuel to the inlet of said pump at substantially constant pressure, a manually operable mechanism for actuating said throttle, means actuated by said mechanism when said throttle is opened beyond a predetermined position for increasing said fuel supply pressure to enrich the fuel-and-air mixture delivered to the engine, and auxiliary means for accomplishing the same purpose as said last-mentioned means independently of the movement and position of said throttle.

HERMAN G. RAUSENBERGER.

REFERENCES CITED

The following references are of record in the file of this patent:

UNITED STATES PATENTS

| Number | Name | Date |
|---|---|---|
| 1,149,322 | Baker | Aug. 10, 1915 |
| 1,164,093 | Houghton et al. | Dec. 14, 1915 |
| 1,181,356 | Thompson et al. | May 2, 1916 |
| 1,199,386 | Kaminski | Sept. 26, 1916 |
| 1,283,043 | Batelle | Oct. 29, 1918 |
| 1,535,344 | Royce | May 14, 1924 |
| 1,559,756 | Kemp | Nov. 3, 1925 |
| 1,623,347 | Kelley et al. | Apr. 5, 1927 |
| 1,720,414 | Gruebler | July 8, 1929 |
| 1,739,918 | Rebillet | Dec. 17, 1929 |
| 2,102,476 | Mennesson | Dec. 28, 1936 |
| 2,096,413 | Swartz et al. | Oct. 19, 1937 |
| 2,238,353 | McCain | Mar. 25, 1940 |
| 2,278,305 | Culp | Mar. 31, 1942 |
| 2,324,599 | Schorn | July 20, 1943 |
| 2,328,604 | Bicknell | Sept. 7, 1943 |
| 2,374,844 | Stokes | May 1, 1945 |

FOREIGN PATENTS

| Number | Country | Date |
|---|---|---|
| 18,045 | England | 1913 |
| 155,333 | England | Dec. 23, 1920 |
| 429,682 | England | June 4, 1935 |
| 358,269 | Germany | Sept. 7, 1922 |